March 2, 1948.    J. A. LEGRIS    2,436,966
PHOTOGRAPHIC EXPOSURE METER
Filed Oct. 1, 1945    2 Sheets-Sheet 1

INVENTOR

March 2, 1948.  J. A. LEGRIS  2,436,966
PHOTOGRAPHIC EXPOSURE METER
Filed Oct. 1, 1945  2 Sheets-Sheet 2
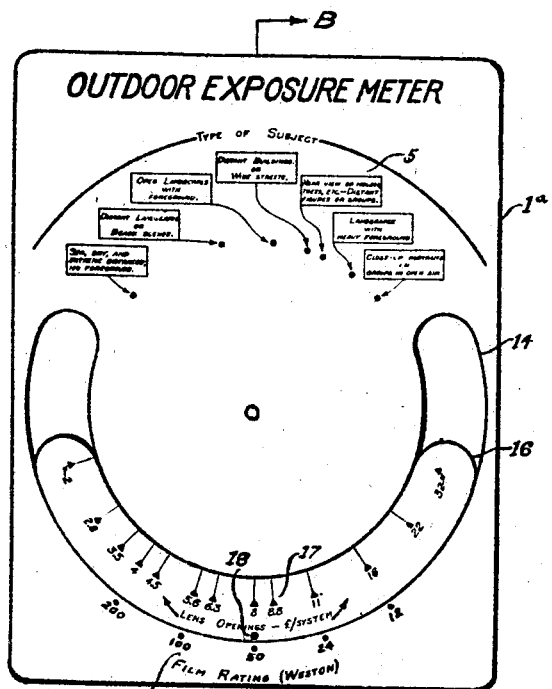
Fig.6
Fig.7
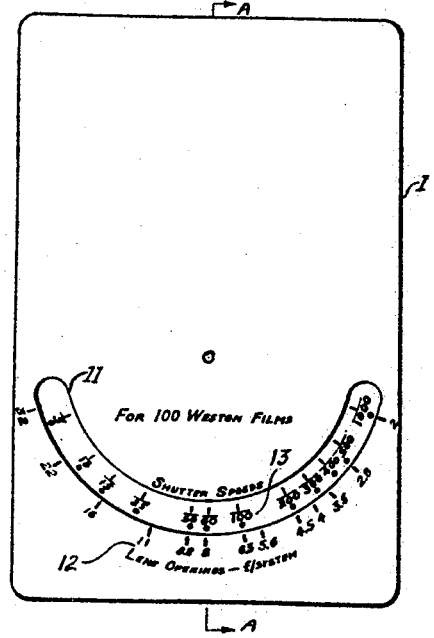
Fig.8
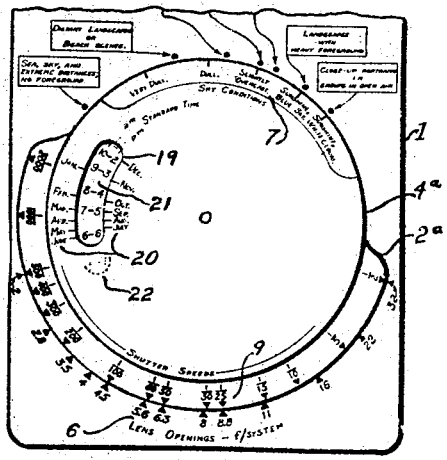
Fig.9
INVENTOR
Joseph A. Legris Patented Mar. 2, 1948

2,436,966

UNITED STATES PATENT OFFICE 2,436,966

PHOTOGRAPHIC EXPOSURE METER

Joseph Antoine Legris, Toronto, Ontario, Canada

Application October 1, 1945, Serial No. 619,463

20 Claims. (Cl. 235—64.7)

This invention relates to a photographic exposure meter, and more particularly to a device for furnishing from certain known conditions an indication of the proper duration of photographic exposure.

More particularly this invention has reference to a meter which is capable of being used by an amateur photographer as well as by a professional, and relies upon well known empirical formulae for combining the various factors that govern the length of exposure, namely type of subjects, conditions of the sky, hour of the day, month of the year, camera lens opening, and shutter speed.

An object of this invention is to provide a device of the type described, which is exceedingly simple in operation, but which shows at a glance the exposure time for a whole series of lens openings.

A further object of this invention is to produce a simple and practical exposure meter of handy construction and of comparatively small cost, which will be efficient, reliable, of small size, and easily understood and manipulated.

A further object is to provide an instrument of the type referred to which can be permanently adjusted for the emulsion speed of the film or plate employed, and in which the proper setting of the camera can be determined directly by moving only two scale elements, namely, one which aligns the time of day in an opening for the current month, and the other which aligns the sky condition with the type of subject to be photographed.

A still further object of this invention is to provide an improved exposure meter of the character described which can be permanently attached to a camera and which comprises relatively few and simple parts; which is relatively inexpensive to manufacture and which at the same time possesses a high degree of accuracy.

Exposure meters or devices intended as guides for use by amateurs have been suggested in the past and many forms thereof are or have been available. All of such devices however, require considerable manipulation, and in some instances, computations are required in order to arrive at the desired results. In the present apparatus, no mathematical computations of any sort are required; a glance at the sky, a look at a watch, and a determination of the subject are all that is needed. This exposure meter integrates all these factors, and the proper exposure is thereby accurately determined.

This exposure meter, although of a relatively high accuracy, does not pretend to have the minute accuracy of the better type of photo-electric meters. However, such photo-electric meters are complicated to operate, and being relatively expensive, are only available to a small number of amateur photographers.

With the above and other objects in view, which will appear with the description, this invention resides in the novel construction, combination, and arrangement of parts, substantially as hereinafter described, and more particularly defined by the appended claims, it being understood that such changes in the precise embodiment of the herein disclosed invention may be made as come within the scope of the claims.

In the drawings wherein like numerals refer to identical parts

Figure 6 is a plan view of a modified version of the above mentioned base member which is adjustable for various film speeds.

Figure 7 is a cross-sectional view of the modified base member shown in Figure 6, taken along the line B—B;

Figure 8 is a plan view of the reverse face of the meter shown in Figure 1; and

Figure 9 is a plan view of the front face of another modified version of the exposure meter.

Figure 1:
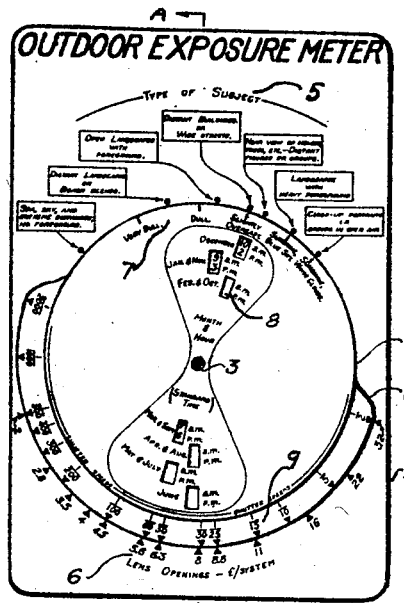
Figure 1 is a plan view of the front face of an exposure meter constructed in accordance with this invention.
Figure 2:
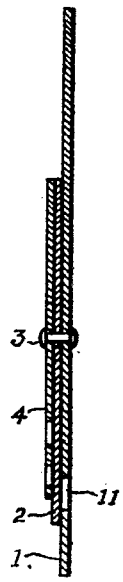
Figure 2 is a cross-sectional view of said meter taken along the line A—A of Figure 1.

Referring now more particularly to Figure 1 the exposure meter comprises a base member 1, a middle disc 2 rotatable on said base member about a pivot 3 and a top disc 4 superimposed on said middle disc 2 and rotatable also about pivot 3.

All the above mentioned members may be formed of any suitable material such as cardboard, plastic or metal sheeting. Also these members can be incorporated as an integral part of any camera by arranging the indicia which are on the base member on a suitable flat portion of the camera and mounting the other two members thereon.

Figure 5:
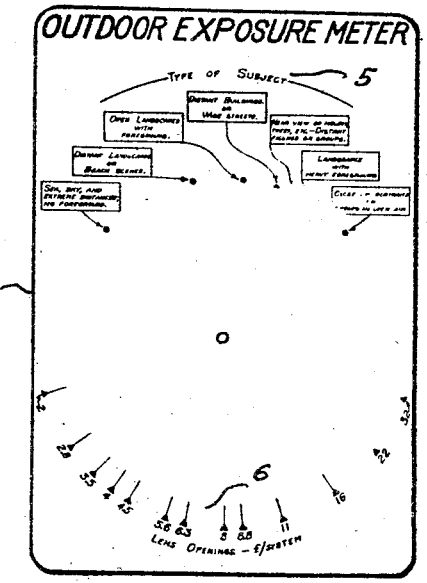
Figure 5 is a plan view of the base member.

The upper portion of said base member is arcuately calibrated with indicia 5 representing the "type of subject" to be photographed, whereas the lower portion has calibrations 6 of "lens openings" also arranged arcuately. The preferred calibrations of "type of subject" which are best illustrated in Figures 1, 5 and 6 are (reading from left to right): "Sea, sky and extreme distances, no foreground"; "Distant landscapes or beach scenes"; "Open landscapes with foreground"; "Distant buildings or wide streets"; "Near views of houses, trees, etc.—distant figures or groups"; "Landscapes with heavy foreground"; "Close-up portraits or groups in open air."

Figure 3:
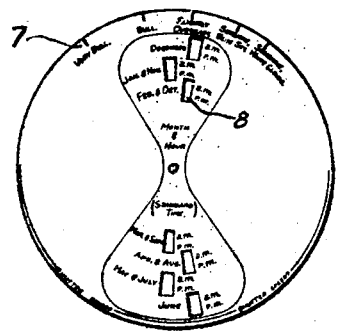
Figure 3 is a plan view of the top disc.

Around the upper periphery of the top disc 4 are arranged calibrations 7 of "sky conditions." The preferred calibrations of "sky conditions" which are best illustrated in Figures 1, 3 and 9 are (reading from left to right): "Very dull"; "Dull"; "Slightly overcast"; "Sunshine, blue sky"; "Sunshine, white clouds." This top disc is suitably pierced by a plurality of openings alongside which are printed the various months of the year; one such opening, that for the months of February and October is indicated at 8.

The lower periphery of the middle disc 2 is arcuately calibrated with indicia 9 representing "shutter speeds." Numerals 10 representing the "hours of the day" are arranged in spaced apart and predetermined relation on the face of this disc. These numerals 10 are adapted to register with and appear through the "month" openings (such as 8) in the top disc.

To operate the meter, the top disc 4 is adjusted with respect to the middle disc 2 to show a correct "time of day" 10 in an opening such as 8 for the "current month." Then retaining this setting (i. e., rotating the top disc and the middle disc together) the point on the top disc 4 representing the prevailing "sky conditions" is adjusted to register with the point on the base member 1 representing the "type of subject" to be photographed.

Any "shutter speed" 9 (indicated on the bottom of the middle disc 2) now gives the correct exposure when used with the "lens opening" 6 (indicated at the bottom of the base member 1) directly below it.

As an example, let it be assumed that it is desired to find the proper exposure to photograph "groups in open air" on a "sunny day with white clouds" at "7 a. m." in the "month of March," using a film having a "Weston rating of 50," such as Kodak Verichrome.

The top disc 4 is first rotated with respect to the middle disc 2 till 7 a. m. on the middle disc appears through the March opening in the top disc. The two discs 2 and 4 are then rotated together till the indication "Sunshine white clouds" on the top disc registers with the indication for "Groups in open air" on the base member. The required exposure is then any "shutter speed" taken in conjunction with the "lens opening" opposite said "shutter speed," for example, 1/50 at f. 63 or 1/25 at f. 8.8, etc. Obviously any other exposure may be ascertained by a similar procedure.

The particular meter illustrated in Figure 1 is for use with films having a "Weston rating" of 50. However, it is obvious that a similar meter for use with film having another rating could be constructed by merely shifting the relative position of any scale (preferably the "lens opening" scale 6). A meter can be constructed for use with two different film ratings by cutting out an arcuate slot 11 in the base member 1, as shown in Figure 8, and printing alongside said arcuate slot in a suitably shifted position indicia 12 representing "lens openings." Also, indicia 13 representing "shutter speeds" would be suitably arranged on the reverse face of the middle disc 2.

It it is desired to have calibrations on the same meter for a third type of film, this could be achieved by cutting out of another portion of the base member 1 (say near the top thereof) a second slot, and by printing a second series of calibrations on the reverse face of the middle disc member 2 to register with indicia on the base member adjacent with said slot.

The calibration of the meter shown in Figure 1 is for films having a "Weston rating" of 50, whereas its reverse side, as shown in Figure 8, is calibrated for films having a "Weston rating" of 100, that is having a speed double that of a Weston 50 film. Referring to the exposure scales, all other factors being equal it is seen for example, that in Figure 1, with a "lens opening" of f. 4.5 an exposure of 1/100 second is required, whereas in Figure 8 with the same "lens opening" of f. 4.5 an exposure of 1/200 second is required. One exposure is therefore exactly half the other; this is in perfect accordance with the fact that one film is twice as "fast" as the other.

Another method of calibrating this meter for various types of films is to print a concentric series of "lens opening" calibrations on the front face of the base member, each series being for one type of film, and each of said series being in spaced relationship to the others.

In Figure 6 is shown a modified form 1ª of the base member for a meter which is adjustable for use with films of any "Weston rating." On the base member 1ª is cut out a bevelled edged arcuate slot 14 along the edges of which are printed in spaced relationship indicia 15 of "Weston film rating." Movably mounted in this arcuate slot 14 is a bevelled edged arcuate strip 16 on which are printed indicia 17 of "lens opening" and on which is also printed an index to register with the indicia 15 of the "film rating." After the strip 16 has been placed in its slot 14, a covering sheet 23 is pasted over the back of base member 1ª, care being taken of course not to apply glue on that portion which lies over the slot. This covering sheet, in conjunction with the bevelled edges of the strip and of the slot, securely keeps these parts assembled. To adjust the meter for the rating of any film used, it is merely necessary to move the arcuate strip to a position so that the index 18 registers with the pertinent "film rating" 15. In Figure 8 the strip is shown adjusted for use with a 50 "Weston film rating." Since the adjustment for film rating would not be varied as often as the other adjustments, this adjustment is most conveniently provided by means of the arcuate strip 16 movable in the arcuate slot 14, as above described. However, if desired, instead of having an arcuate strip movable and held in position by the arcuate slot, the said strip may be extended in area so as to be secured at pivot 3. The arcuate strip is essentially a portion of a third disc rotatable about pivot 3, and it is clear that the whole disc could be substituted for the arcuate portion thereof preferably used herein.

Figure 7 which is a cross-sectional view of the modified base member shows the bevelled edged arcuate strip 16 mounted in the bevelled edged arcuate slot 14 cut out of the base member 1ª. Although the arcuate strip is most conveniently mounted on the base member, it is obvious that by altering the shape and proportion of either the top disc 4 or the middle 2, it could be mounted on the discs.

Figure 4:
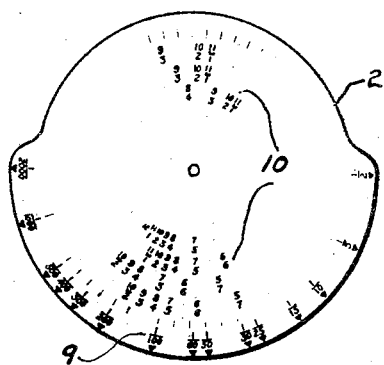
Figure 4 is a plan view of the middle disc.

In Figure 9 is shown another modification of the preferred form exposure meter wherein instead of having a plurality of slots 8 in top disc 4 opposite each of which are printed the pertinent month of the year, as shown in Figure 1, a single arcuate slot 19 is provided in top disc 4a alongside which are printed in spaced relation indicia 20 for all the months of the year. The "hour of day" numerals 21 on the modified middle disc 2a are necessarily printed in a different spaced relationship to the "hour of day" numerals 10 shown in Figure 4. To operate this modified meter it is merely necessary to set the pertinent "hour of day" numeral opposite the pertinent "month of the year" indicia 20; the other scales are set in the same fashion as hereinbefore described, and the exposure is determined in the same way.

This modified meter cannot be as accurate as the preferred form shown in Figure 1. The intensity of light (all other factors being equal) varies both with the season of the year and the hour of the day. In other words, the difference in light intensity between any two hours of the day varies in each month, or to be more accurate, in each day of the year. For example, the difference in light intensity between 3 and 4 p. m. in June is very different to that between 3 and 4 p. m. in December. The meter shown in Figure 9 considers merely the average variation in light intensity between any two hours of the day throughout the year; however, it is reasonably accurate. At 22 on the middle disc 2a of this meter, is printed a curved line to indicate that the meter is not to be set beyond a point which will make this line appear in the slot 19. Beyond that point, the light conditions are too unfavourable for suitable photography. For example, it is impossible to take a good outdoor photograph without special equipment at 5 a. m. in December.

This exposure meter can also be adapted for use with motion-picture cameras by substituting calibrations of "frames per second" for the "shutter speed" calibrations. Since the speed of popular brand motion picture cameras is standardized, the shutter speed calibrations of the meter shown in Figure 1 or those of "frames per second" could be completely eliminated and replaced either by a simple indexing point or by other desired calibrations, for example of "Weston film rating."

The accuracy of this meter is greatest between certain given latitudes. The accuracy of the meters illustrated in the drawings is greatest between latitudes N. 42° and N. 49°, for example, in the northern half of the United States and in the southern part of Canada, but they may be used with fairly satisfactory results in adjoining latitudes. The only changes required in the meter for accurate use in other latitudes would be in the spacing of the "hour of the day" numerals 10 on the middle disc 2; no changes would be necessary on the base 1 or on the top disc 4.

For easy manipulation the meter should be constructed in such a way that the top disc 4 can rotate without necessarily rotating the middle disc, and also so that when the middle disc 2 is rotated, the top disc 4 will rotate with it. This feature could easily be achieved by constructing the meter so that the friction between the top and middle discs is considerably less than the friction between the middle disc and the base member; means for this are well known in the art.

Whenever throughout the specification and claims, reference is made to "apertures," "slots," or "openings," it is of course obvious that these expressions are not intended to cover only actual physical perforations but also include solid portions which have been made of suitable transparent material.

Having thus described the invention it is thought that the construction and use thereof will be apparent from the above description of the various parts and their purpose. It is to be understood that the form of the invention herewith shown and described, is to be taken as a preferred example of the same, and that various changes in the shape, size and arrangement of parts may be resorted to, without departing from the spirit of the invention, or the scope of the claims.

What I claim as my invention is:

1. A photographic exposure meter, comprising a base member having a plurality of groups of indications arranged thereon; a rotatable disc mounted on said base member and having a group of indications arranged thereon to register with one of said groups of indications on the base and being provided with a series of spaced apart indicating tables; a second rotatable disc mounted over the face of the first rotatable disc and having indications arranged thereon to register with another group of indications on said base, said second rotatable disc being slotted in order to expose the tables on the first disc.

2. A photographic exposure meter, comprising a base member having a plurality of groups of indications arranged thereon; a rotatable disc mounted on said base member and having a group of indications arranged thereon to register with one of said groups of indications on the base and being provided with a series of spaced apart indicating tables; a second rotatable disc mounted over the face of the first rotatable disc and having a group of indications arranged thereon to register with another group of indications on said base, said second rotatable disc being slotted in order to expose the tables on the first disc, and said second rotatable disc having indicia adjacent said slotting to register with the indicating tables on the first disc.

3. A photographic exposure meter, comprising a base member having a plurality of groups of indications arranged thereon; a rotatable disc mounted on said base member and having a group of indications arranged thereon to register with one of said groups of indications on the base and being provided with a series of spaced-apart indicating tables representing the time of day; a second rotatable disc mounted over the face of the first rotatable disc and having a group of indications arranged thereon to register with another group of indications on said base, said second rotatable disc being slotted in order to expose the tables on the first disc and having indicia representing the calendar months adjacent said slotting to register with the time of day tables on the first disc.

4. A photographic exposure meter, comprising a base member having a plurality of groups of indications arranged thereon; a rotatable disc mounted on said base member and having indications arranged thereon to register with one of said groups of indications on the base and being provided with a series of spaced apart indicating tables representing the time of day; a second rotatable disc mounted over the face of the first rotatable disc and having a group of indications arranged thereon to register with another group of indications on said base, said second rotatable disc having a plurality of slots therein and indicia adjacent said slots to indicate the calendar months, said calendar month indicating slots being adapted to register with the time of day tables on the first disc.

5. A photographic exposure meter, comprising a base member having a plurality of groups of indications arranged thereon; a rotatable disc mounted on said base member and having indications arranged thereon to register with one of said groups of indications on the base and being provided with a series of spaced apart indicating tables; a second rotatable disc mounted over the face of the first rotatable disc and having a group of indications arranged to register with another group of indications on said base, said second rotatable disc being slotted in order to expose the tables on the first disc, the portion of said first rotatable disc on which the indications are arranged extending beyond the periphery of said second rotatable disc thereby shielding the other group of indications on the base member and rendering the meter inoperative when the user attempts to register the indications on the first mentioned disc with the said other group of indications on the base member.

6. A photographic exposure meter, comprising a base member having an arcuate slot therein and having a plurality of groups of indications arranged on the front face thereof; a rotatable disc mounted on said base member and having indicating marks on the front face thereof arranged to register with one of said groups of indications on the base, one of said registering groups of indications being also reproduced along the arcuate slot on the reverse face of the base member, and the group of indicating marks being also reproduced on the reverse face of the said rotatable disc so as to appear through the arcuate slot in the base member and register with the reproduced group of indications along said arcuate slot on the reverse face of the base member, said rotatable disc being provided with a series of spaced-apart indicating tables on the front face thereof; a second rotatable disc mounted over the face of the first rotatable disc and having indicating marks arranged to register with another group of indications on the front face of said base member, said second rotatable disc being slotted in order to expose the tables on the first disc.

7. A photographic exposure meter comprising a base member having an arcuate slot therein and having a plurality of groups of indications arranged on the front face thereof; a rotatable disc mounted on said base member and having indicating marks on the front face thereof arranged to register with one of said groups of indications on the base member, one of said registering groups of indications being also reproduced along the arcuate slot on the reverse face of the base member, and the group of indicating marks being also reproduced on the reverse face of the said rotatable disc to appear through the arcuate slot in the base member and register with the reproduced group of indications along said arcuate slot on the reverse face of the base member, said rotatable disc being provided with a series of spaced-apart indicating tables on the front face thereof representing the time of day; a second rotatable disc mounted over the face of the first rotatable disc and having indicating marks arranged to register with another group of indications on the front face of said base member, said second rotatable disc being slotted in order to expose the tables on the first disc and having indicia representing the calendar months adjacent said slotting adapted to register with the said tables.

8. A photographic exposure meter, comprising a base member having an arcuate slot therein and having a plurality of groups of indications arranged on the front face thereof; a rotatable disc mounted on said base member and having indicating marks on the front face thereof arranged to register with one of said groups of indications on the base member, one of said registering groups of indications being also reproduced along the arcuate slot on the reverse face of the base member and the group of indicating marks being also reproduced on the reverse face of the said rotatable disc to appear through the arcuate slot in the base member and register with the group of indications along said arcuate slot on the reverse face of the base member, said rotatable disc being provided with a series of spaced-apart indicating tables on the front face thereof representing the time of day; a second rotatable disc mounted over the face of the first rotatable disc and having indicating marks arranged to register with another group of indications on the front face of said base member and said second rotatable disc having a plurality of slots therein and indicia adjacent said slots to indicate the calendar months, said calendar month indicating slots being adapted to register with the time of day tables on the first disc.

9. A photographic exposure meter having means to account for variations in light intensity due to time of day and month of the year, and having sets of indicia representing respectively type of subject, brightness conditions, lens openings and shutter speed, comprising a base member on which two of the above sets of indicia are arranged; a rotatable disc member having arranged thereon around the periphery thereof one of the other sets of the above indicia; another rotatable disc member having arranged thereon around the periphery thereof another of the sets of the above indicia; the disc members being rotatable about a common axis, the first mentioned disc member having on the face thereof in spaced apart relation indicia representing time of day and said second disc member being apertured to show therethrough said last mentioned indicia, and having month-representing indicia adjacent said aperturing.

10. A photographic exposure meter having sets of indicia representing type of subject, brightness conditions, lens openings and shutter speed, comprising a base having two sets of the above indicia arranged theron; a rotatable disc having arranged thereon around the periphery thereof one of the other sets of the above indicia; and a second rotatable disc having arranged thereon still another set of the above indicia, the second disc being apertured, and there being designations representing months and hours arranged on the surface of said disc and associated with said apertures; said sets of indicia being calculated and arranged so that when the indicia on one disc is arranged in a designated manner relative to the indicia on the base, and the apertures on the second disc are arranged in a predetermined relationship to the indicia on the first disc, indicia representing lens openings will register with indicia representing the shutter speed to indicate the desired combination for the predetermined conditions of type of subject, brightness and time.

11. A photographic exposure meter having indicia representing film rating, an indexing point, type of subject, brightness conditions, lens openings and shutter speeds, said meter comprising a base member and three superimposed members rotatable about a common axis on the base member, the base member having thereon two sets of the above indicia; one of the rotatable members having arranged thereon around the periphery thereof two of the other sets of the above indicia and another of the rotatable members having arranged thereon around the periphery thereof still another set of the above indicia; the remaining rotatable member having arranged thereon the remaining set of the above indicia; the remaining rotatable member being apertured; and there being designations representing months on said apertured rotatable member associated with the apertures; and there being designations representing hours on the surface of the rotatable member immediately underneath the apertured member and adapted to register with the apertures; said sets of indicia being calculated and arranged so that when the members bearing the indicia representing the film rating, the indexing point, the type of subject and the brightness conditions are arranged in a designated manner relative to each other, and the apertured member is arranged in a predetermined relationship to the member immediately underneath it, indicia representing lens openings will register with indicia representing the shutter speed to indicate the desired combination for the predetermined conditions of film rating, type of subject, brightness and time.

12. A photographic exposure meter, comprising a base having a plurality of groups of indications arranged thereon; a rotatable middle disc also having a plurality of groups of indications thereon, one of said middle disc groups of indications being adapted to register with and be indexed by one of the groups of indications on the base; a rotatable slotted top disc concentric with the middle disc having a plurality of groups of indications thereon, one of said top disc groups of indications being adapted to register with and be indexed by a second group of indications on the base, and the other of said top disc groups of indications being adjacent the slotting, said slotting and said other top disc group of indications being adapted to register with and be mutually indexed by the second group of indications on the middle disc.

13. A photographic exposure meter, comprising a base member having a plurality of groups of indications arranged thereon; one of said groups of indications being on a movable member and being adapted to register with and be indexed by an adjacent fixed group of indications; a rotatable middle disc also having a plurality of groups of indications thereon, one of said middle disc groups of indications being adapted to register with and be indexed by one of the groups of indications on the base; a rotatable slotted top disc concentric with the middle disc and having a plurality of groups of indications thereon, one of said top disc groups of indications being adapted to register with and be indexed by a second group of indications on the base, and the other of said top disc groups of indications being adjacent the slotting, said slotting and said other group of top disc indications being adapted to register with and be mutually indexed by the other of said middle disc groups of indications.

14. A photographic exposure meter comprising a base member having thereon a group of indicia representing type of subject and another group of indicia representing lens openings, a rotatable disc mounted on said base and having on the periphery thereof a group of indicia representing shutter speeds and being adapted to register with one of the groups of indicia on the base member, and also having on the surface thereof spaced apart tables representing time of day; another rotatable disc, concentric with said first mentioned disc, having on the periphery thereof a group of indicia representing sky conditions adapted to register with the other group of indicia of the base, and having month indicating openings therein adapted to register with the time of day tables on the first mentioned disc.

15. A photographic exposure meter comprising a base member having thereon a group of indicia representing type of subject and another group of indicia representing shutter speeds; a rotatable disc mounted on said base and having on the periphery thereof a group of indicia representing lens openings and being adapted to register with one of the groups of indicia on the base member and also having on the surface thereof spaced apart tables representing time of day; another rotatable disc, concentric with said first mentioned disc, having on the periphery thereof a group of indicia representing sky conditions adapted to register with the other group of indicia of the base, and having month indicating openings therein adapted to register with the time of day tables on the first mentioned disc.

16. A photographic exposure meter comprising a base member having thereon a group of indicia representing type of subject and another group of indicia representing film rating; a rotatable member mounted on said base member and having thereon an index adapted to register with the film rating indicia on the base and also having thereon a group of indicia representing lens openings; a rotatable disc mounted on said base concentric with the rotatable member and having on the periphery thereof a group of indicia representing shutter speeds and which is adapted to register with the lens openings indicia on the rotatable member and also having on the surface thereof spaced apart tables representing the time of day; another rotatable disc concentric with said first mentioned disc and with said rotatable member having on the periphery thereof a group of indicia representing sky conditions adapted to register with that group of indicia on the base representing type of subject, and having month indicating openings therein adapted to register with the time of day tables on the first mentioned disc.

17. A photographic exposure meter, comprising a base member having an arcuate slot therein and having a plurality of groups of indications arranged on the front face thereof; a rotatable disc mounted on said base member and having a group of indications on the front face thereof arranged to register with one of said groups of indications on the base member and being provided with a series of spaced apart indicating tables on the front face thereof; a second rotatable disc mounted over the front face of the first rotatable disc and having a group of indications on the front face thereof arranged to register with another group of indications on the front face of the base member, said second rotatable disc being slotted in order to expose the tables on the first disc; one of the said groups of indications being also reproduced along the arcuate slot on the reverse face of the base member and another of the said group of indications being also reproduced on the reverse face of the first rotatable disc so as to appear through the arcuate slot in the base member and register with the reproduced group of indications along said arcuate slot on the reverse face of the base member.

18. A photographic exposure meter, comprising a base member having an arcuate slot therein and having a plurality of groups of indications arranged on the front face thereof; a rotatable disc mounted on said base member and having a group of indications on the front face thereof arranged to register with one of said groups of indications on the base member and being provided with a series of spaced apart indicating tables on the front face thereof representing the time of day; a second rotatable disc mounted on the front face of the first rotatable disc having a group of indications on the front face thereof arranged to register with another group of indications on the front face of the base member, said second rotatable disc being slotted in order to expose the tables on the first disc and having indicia representing the calendar months adjacent said slotting adapted to register with the time of day tables on the first disc; one of the said groups of indications being also reproduced along the arcuate slot on the reverse face of the base member and another of the said group of indications being also reproduced on the reverse face of the first rotatable disc so as to appear through the arcuate slot in the base member and register with the reproduced group of indications along said arcuate slot on the reverse face of the base member.

19. A photographic exposure meter comprising a base member having thereon a group of indicia representing type of subject and another group of indicia representing lens openings; a rotatable disc mounted on said base member and having on the periphery thereof a group of indicia representing film rating and being adapted to register with one of the groups of indicia on the base member and also having on the surface thereof spaced apart tables representing time of day; another rotatable disc, concentric with said first mentioned disc, having on the periphery thereof a group of indicia representing sky conditions adapted to register with the other group of indicia of the base, and having month indicating openings therein adapted to register with the time of day tables on the first mentioned disc.

20. A photographic exposure meter comprising a base member having thereon a group of indicia representing type of subject and another group of indicia representing film rating; a rotatable disc mounted on said base and having on the periphery thereof a group of indicia representing lens openings and being adapted to register with one of the groups of indicia on the base member and also having on the surface thereof spaced apart tables representing time of day; another rotatable disc, concentric with said first mentioned disc, having on the periphery thereof a group of indicia representing sky conditions adapted to register with the other group of indicia of the base, and having month indicating openings therein adapted to register with the time of day tables on the first mentioned disc.

JOSEPH ANTOINE LEGRIS.

REFERENCES CITED

The following references are of record in the file of this patent:

UNITED STATES PATENTS

| Number | Name | Date |
|---|---|---|
| 668,896 | Wager-Smith | Feb. 26, 1901 |
| 1,207,448 | Venable | Dec. 5, 1916 |
| 1,262,635 | Cady | Apr. 16, 1918 |
| 1,478,956 | Harrold | Dec. 25, 1923 |
| 2,287,430 | Kende et al. | June 23, 1942 |